(12) United States Patent
Goto et al.

(10) Patent No.: US 7,117,826 B2
(45) Date of Patent: Oct. 10, 2006

(54) PILOT OIL IGNITION GAS ENGINE AND METHOD OF OPERATING PILOT OIL IGNITION GAS ENGINE

(75) Inventors: Satoru Goto, Tokyo (JP); Yoshifumi Nishi, Tokyo (JP)

(73) Assignee: Niigata Power Systems Co., Ltd., (JP)

( * ) Notice: Subject to any disclaimer, the term of this patent is extended or adjusted under 35 U.S.C. 154(b) by 0 days.

(21) Appl. No.: 11/348,189

(22) Filed: Feb. 6, 2006

(65) Prior Publication Data

US 2006/0124080 A1 Jun. 15, 2006

Related U.S. Application Data

(62) Division of application No. 10/415,046, filed as application No. PCT/JP02/08727 on Aug. 29, 2002, now Pat. No. 7,028,645.

(30) Foreign Application Priority Data

Aug. 29, 2001 (JP) ............................. 2001-259847

(51) Int. Cl.
 *F02B 3/00* (2006.01)

(52) U.S. Cl. ................. 123/27 GE; 123/1 A; 123/256; 123/304; 123/525

(58) Field of Classification Search ........... 123/27 GE, 123/256, 1 A, 304, 431, 525
See application file for complete search history.

(56) References Cited

U.S. PATENT DOCUMENTS 6,209,511 B1 4/2001 Goto et al.

FOREIGN PATENT DOCUMENTS

| EP | 0 957 246 A2 | 11/1999 |
|---|---|---|
| JP | 1-167452 | 7/1989 |
| JP | 11-324805 | 11/1999 |
| JP | 2000-64838 | 2/2000 |

*Primary Examiner*—Tony M. Argenbright
*Assistant Examiner*—Katrina B. Harris
(74) *Attorney, Agent, or Firm*—Ostrolenk, Faber, Gerb & Soffen, LLP

(57) ABSTRACT

The gas engine of the present invention has a pilot oil fuel valve, a pilot oil pump, and first and second pipes connected to a pilot oil main pipe, for each of a plurality of combustion chambers. An operating pilot oil tank and an ignition stimulant-added pilot oil tank are connected via a switching valve to a third pipe, connected to an end of the pilot oil main pipe. Before operating stops, the pilot oil is discharged by opening an exhaust valve, and thereafter, the switching valve is switched and pilot oil which the ignition stimulant has been added to is supplied into the pipe. Consequently, the pilot oil downstream from the main pipe is replaced with the pilot oil which the ignition stimulant has been added to. Therefore, at the time of the next activation, pilot oil which the ignition stimulant has been added to is sprayed from the fuel valve, and, as a result, misfire at the time of activation is reduced, and a highly reliable engine is obtained.

8 Claims, 5 Drawing Sheets

PILOT OIL IGNITION GAS ENGINE AND METHOD OF OPERATING PILOT OIL IGNITION GAS ENGINE

CROSS REFERENCE TO RELATED APPLICATON

The present application is a divisional of U.S. patent application Ser. No. 10/415,046, filed Apr. 23, 2003 now U.S. Pat. No. 7,028,645, which is a 35 U.S.C. §371 national phase conversion of PCT/JP02/08727, filed Aug. 29, 2002, which claims the priority of Japanese Application No. 2001-259847, filed Aug. 29, 2001 in the names of Satoru GOTO and Yoshifumi NISHI and entitled PILOT OIL IGNITION GAS ENGINE AND METHOD OF OPERATING PILOT OIL IGNITION GAS ENGINE, which are incorporated by reference. The PCT International Application was published in the Japanese language.

BACKGROUND OF THE INVENTION

1. Field of the Invention

The present invention relates to a structure of a gas engine for reducing the ratio of misfire generated at the time of activating a pilot oil ignition type gas engine, and increasing the activation stability, and also relates to an operating method of the gas engine.

2. Description of Related Art

Since pilot ignition type gas engines, which perform compression ignition, have higher ignition energy than conventional spark plug ignition type gas engines, they can achieve a far greater increase in output. However, a pilot ignition oil type gas engine is also ignited by a spark plug or the like, since compression ignition is difficult at the time of activating in a low-temperature combustion chamber. Therefore, to make the engine more economical by reducing the number of its components, or to achieve smoother activation, there is a need to adjust conditions so as to enable earlier compression ignition and realize pilot oil ignition operation from the cranking time.

FIG. 1 is a cross-sectional view of the region near a cylinder head 1 of a pilot oil ignition type gas engine proposed by the present inventors. A spark plug 4 for activation is provided in a main combustion chamber 2 in which a piston 3 rises and falls. Furthermore, a preparatory combustion chamber 5 for pilot oil ignition leads to the main combustion chamber 2. A pilot oil fuel valve 6 is provided inside the preparatory combustion chamber 5. The pilot oil fuel valve 6 is connected via a pipe 8 to a pilot oil pump 7. The pilot oil pump 7 is driven by the driving force of the gas engine. Although not illustrated in FIG. 1, the pilot oil pump 7 is connected via a pipe to a pilot oil tank. Furthermore, although not illustrated in FIG. 1, gas fuel is supplied from a fuel supply source via a fuel supply valve to the main combustion chamber 2.

At the time of activation, a spark is generated by the electrode of the spark plug 4 at an appropriate timing, and the gas fuel supplied into the main combustion chamber 2 is ignited. The pilot oil is forced to the pilot oil fuel valve 6 by the pilot oil pump 7 which is driven by the engine. The pressure applied to the pilot oil increases as the number of rotations of the engine increases, and the pilot oil starts to spray into the preparatory combustion chamber 5 at the point where this pressure exceeds the valve-open pressure of the pilot oil fuel valve 6. Then, when the temperature inside the preparatory combustion chamber 5 at the time of spraying the pilot oil has exceeded the self-ignition temperature of the pilot oil, the pilot oil ignition operation begins, and the spark plug 4 stops sparking.

When misfire is generated during the activation, uncombusted gas is released into the exhaust. When the ratio of generated misfire increases, so does the density of combustion gas in the exhaust pipe, and, when the gas density reaches a flammable range, there is a danger of sudden combustion in the exhaust pipe. Furthermore, when the ratio of misfire increases, the engine may fail to activate (stall).

Therefore, in a system using a gas engine, it is important to reduce misfire at the time of activation.

DISCLOSURE OF INVENTION

The invention according to a first aspect is characterized in that, in a pilot oil ignition type gas engine having a pilot oil fuel valve provided in a combustion chamber, an operating pilot oil tank, and a pipe section which connects the pilot oil fuel valve to the operating pilot oil tank, the pilot oil ignition type gas engine being compression-ignited by pilot oil sprayed from the pilot oil fuel valve into the combustion chamber, an ignition stimulant-added pilot oil tank is connected to the pipe section via a pilot oil switching valve.

Furthermore, the invention according to a second aspect is characterized in that, in a pilot oil ignition type gas engine having a plurality of pilot oil combustion valves provided in a plurality of combustion chambers, a plurality of pilot oil pumps provided to each of the pilot oil combustion valves, a plurality of first pipes which connect the pilot oil combustion valves with the corresponding pilot oil pumps, a pilot oil main pipe, a plurality of second pipes which connect the pilot oil pumps to the pilot oil main pipe, an operating pilot oil tank, and a pipe which connects an end of the pilot oil main pipe to the operating pilot oil tank, a pilot oil exhaust valve is provided at another end of the pilot oil main pipe, and an ignition stimulant-added pilot oil tank being connected to the third pipe via a pilot oil switching valve.

Furthermore, the invention according to a third aspect is characterized in that, in a pilot oil ignition type gas engine having a pilot oil fuel valve provided in a combustion chamber, an operating pilot oil tank, and a pipe which connects the pilot oil fuel valve to the operating pilot oil tank, the pilot oil ignition type gas engine being compression-ignited by pilot oil sprayed from the pilot oil fuel valve into the combustion chamber, an ignition stimulant-added pilot oil tank is connected to the pipe via a flow adjusting valve.

Furthermore, the invention according to a fourth aspect is characterized in that, in a pilot oil ignition type gas engine having a plurality of pilot oil combustion valves provided in a plurality of combustion chambers, a plurality of pilot oil pumps provided to each of the pilot oil combustion valves, a plurality of first pipes which connect the pilot oil combustion valves with the corresponding pilot oil pumps, a pilot oil main pipe, a plurality of second pipes which connect the pilot oil pumps to the pilot oil main pipe, an operating pilot oil tank, and a pipe which connects an end of the pilot oil main pipe to the operating pilot oil tank, a pilot oil exhaust valve is provided at another end of the pilot oil main pipe, and an ignition stimulant-added pilot oil tank is connected to the third pipe via a flow adjusting valve.

In the pilot oil ignition type gas engine as described in the second and fourth aspects of the invention, it is preferable that the pilot oil exhaust valve and the operating pilot oil tank are connected by a fourth pipe, and that the pilot oil discharged from the pilot oil exhaust valve is returned to the operating pilot oil tank.

Furthermore, in the pilot oil ignition type gas engine as described in the third and fourth aspects of the invention, it is preferable that the pilot oil exhaust valve and the operating pilot oil tank are connected by a fourth pipe, and that the pilot oil discharged from the pilot oil exhaust valve is returned to the operating pilot oil tank.

Furthermore, in the pilot oil ignition type gas engine as described in the third and fourth aspects of the invention, it is preferable that a pressure pump for mixing an ignition stimulant into the pilot oil inside the pipe (or the third pipe) is provided between the ignition stimulant tank and the flow adjusting valve.

Moreover, in the pilot oil ignition type gas engine as described in the third and fourth aspects of the invention, it is preferable that the head height to the ignition stimulant tank is higher than the head height to the operating pilot oil tank.

Furthermore, the invention according to a fifth aspect provides an operating method for a pilot oil ignition type gas engine, which is compression-ignited by pilot oil sprayed from a pilot oil fuel valve into a combustion chamber, connected to an operating pilot oil tank, the pilot oil which is sprayed into the combustion chamber at the time of activation comprising ignition stimulant-added pilot oil.

In this case, for example, before operating stops, at least part of the pilot oil inside the pipe and the pilot oil fuel valve from the operating pilot oil tank to the pilot oil fuel valve comprises pilot oil which ignition stimulant has been added to, so that pilot oil which ignition stimulant has been added to is sprayed into the combustion chamber at the time of the next activation.

BEST MODE FOR CARRYING OUT THE INVENTION

A first example of a preferred embodiment of the present invention will be explained with reference to FIGS. 1 to 4.

Figure 1:
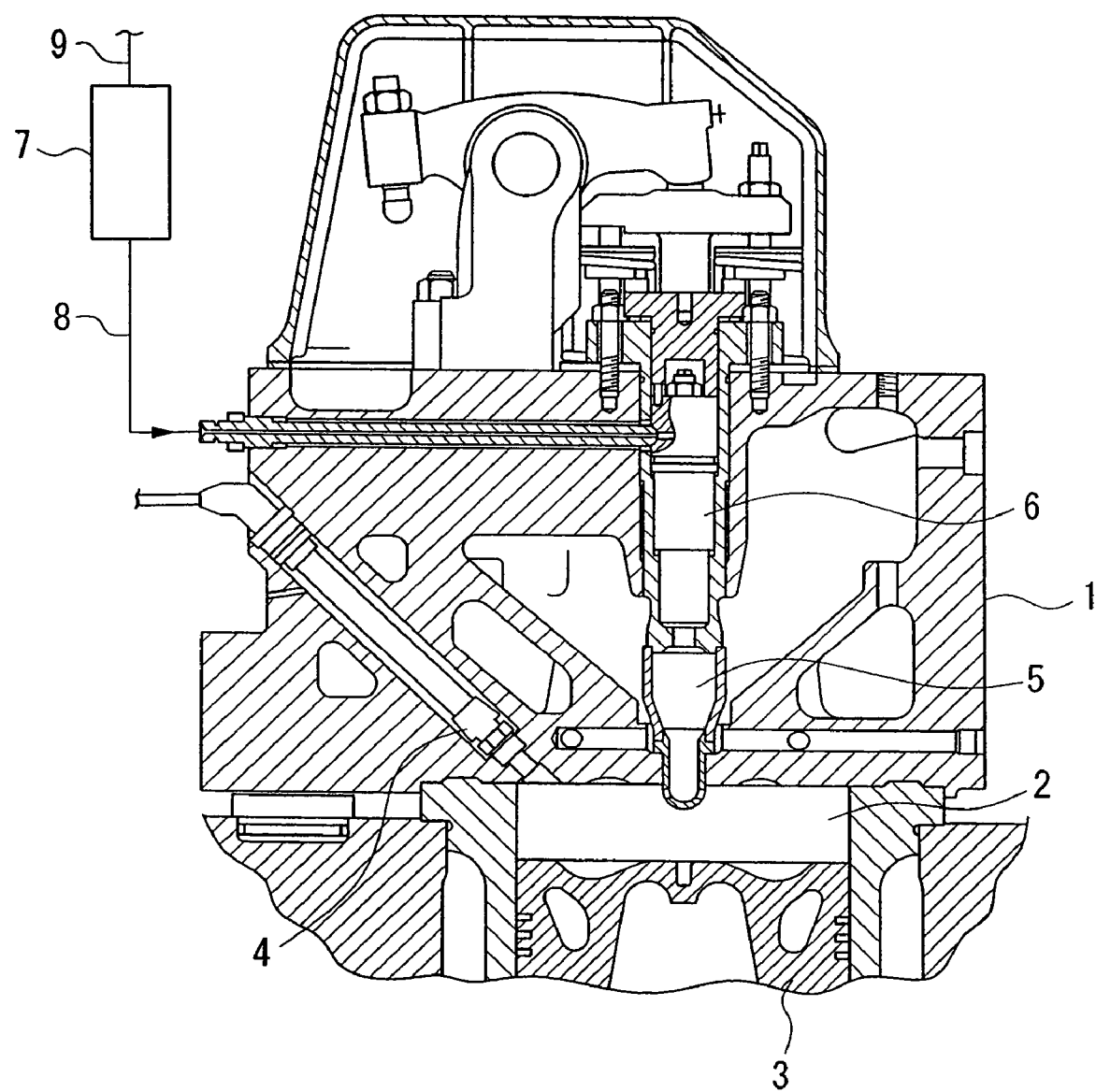
FIG. 1 is a cross-sectional view of the region near a cylinder head of a pilot oil ignition type gas engine proposed by the present inventors.

The constitution of the components around the main combustion chamber of the gas chamber in this example is the same as that shown in FIG. 1. That is, in a cylinder head 1, a preparatory combustion chamber 5 leads to a main combustion chamber 2 in which a piston 3 rises and falls, and a pilot oil fuel valve 6 is provided inside the preparatory combustion chamber 5. The pilot oil fuel valve 6 is connected via a first pipe 8 to a pilot oil pump 7, which is driven by the driving force of the gas engine. Furthermore, as shown in FIG. 2, the pilot oil pump 7 is connected via a second pipe 9 to a pilot oil main valve 10.

Figure 2:
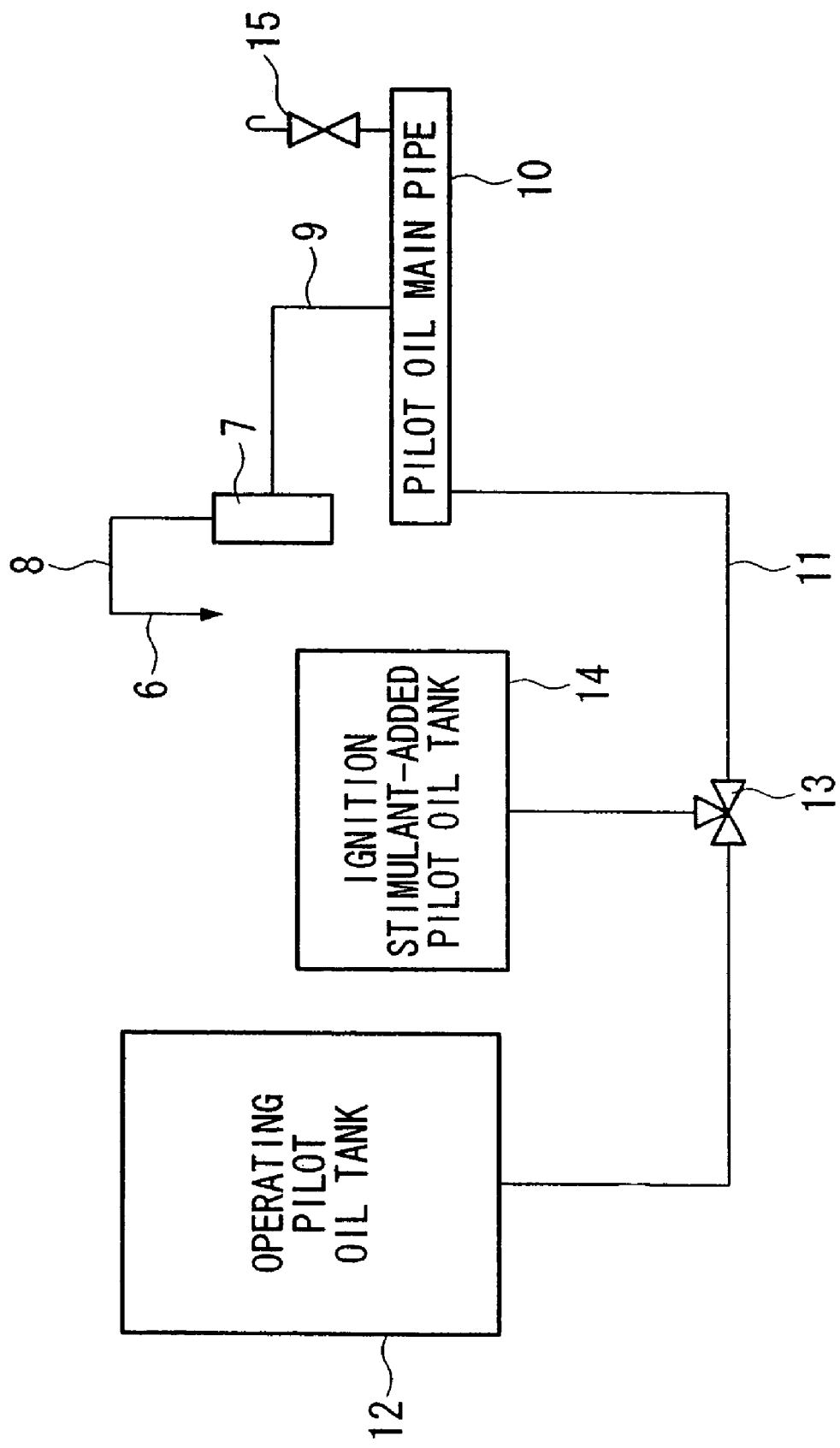
FIG. 2 is a schematic view illustrating the constitution of a first example of the present invention.

FIGS. 1 and 2 show only one pair comprising the pilot oil fuel valve 6 and the pilot oil pump 7, but since the gas engine of this example has multiple cylinders, the pilot oil fuel valve 6, the pilot oil pump 7, and the first and second pipes 8 and 9, are provided in each cylinder.

As shown in FIG. 2, the second pipe 9 connects to a common pilot oil main pipe 10. Although not shown in detail in FIG. 2, a plurality of second pipes 9 correspond to a plurality of pilot oil fuel valves 6, and are connected to the pilot oil main valve 10 at predetermined intervals. Further, an operating pilot oil tank 12 is connected to one end of the pilot oil main valve 10. The pilot oil tank 12 stores pilot oil which is sprayed into the combustion chamber for pilot oil ignition by compression ignition.

Oil having an ignition point of between 40° C. and 70° C., and a cetane number and cetane index of between 40 and 60, can be used as the pilot oil. Specific examples are light oil or fuel oil A. The preferable properties of this light oil are that it should have an ignition point of greater than 50° C., a flow point of less than −2.5° C., satisfying a JIS K 2070 (the residual carbon element of residual oil distilled to 10% being less than 0.1 wt % according to Condrason's method), the cetane number and cetane index of greater than 50, a kinematic viscocity of greater than 2.7 cSt at 30 C, and an orpiment element of less than 0.5 wt %. Furthermore, the preferable properties of the fuel oil A are that it should have an ignition point of greater than 60 C, a flow point of less than 6 C, satisfying a JIS K 2070 (the residual carbon element of residual oil distilled to 10% being less than 1.3 wt % according to Condrason's method), the cetane number and cetane index of greater than 45, a kinematic viscosity of less than 5.5 cSt at 50 C, and an orpiment element of less than 1.0 wt %.

An ignition stimulant-added pilot oil tank 14 is connected midway along a third pipe 11. The ignition stimulant-added pilot oil tank 14 stores pilot oil which an ignition stimulant has been added to, for use at the time of activation. By using the pilot oil which an ignition stimulant has been added to, the pilot oil ignition operation can be performed earlier.

The ignition stimulant should be one which can increase the cetane number of the pilot oil and safely stimulate ignition without causing problems to the engine; the cetane number of the pilot oil should be increased by 5% to 25% as a result of adding the ignition stimulant. For example, alkyl nitrate, alkylene nitrate, amine nitrate, and the like, can be used as the ignition stimulant; more specific examples are 2-ethyl hexyl nitrate or 2,2-dinitro propane. Furthermore, any type of commercially available additive which is added to diesel oil used as diesel engine fuel, and which contains at least one of the above substances, can be used as the ignition stimulant.

Furthermore, a pilot oil exhaust valve 15 is provided at the other end of the pilot oil main valve 10, and faces upwards. Before the end of the operation of the engine, this valve is opened to discharge the pilot oil in the pipe, and the ignition stimulant-added pilot oil is fed from the ignition stimulant-added pilot oil tank 14 into the pipe, thereby replacing the pilot oil with the ignition stimulant-added pilot oil. Incidentally, although illustrated in the diagrams, the exit of the pilot oil exhaust valve 15 may be connected to the pilot oil tank 12 by a fourth pipe, so as to return the pilot oil discharged from the pilot oil main valve 10 to the pilot oil tank 12.

Figure 3:
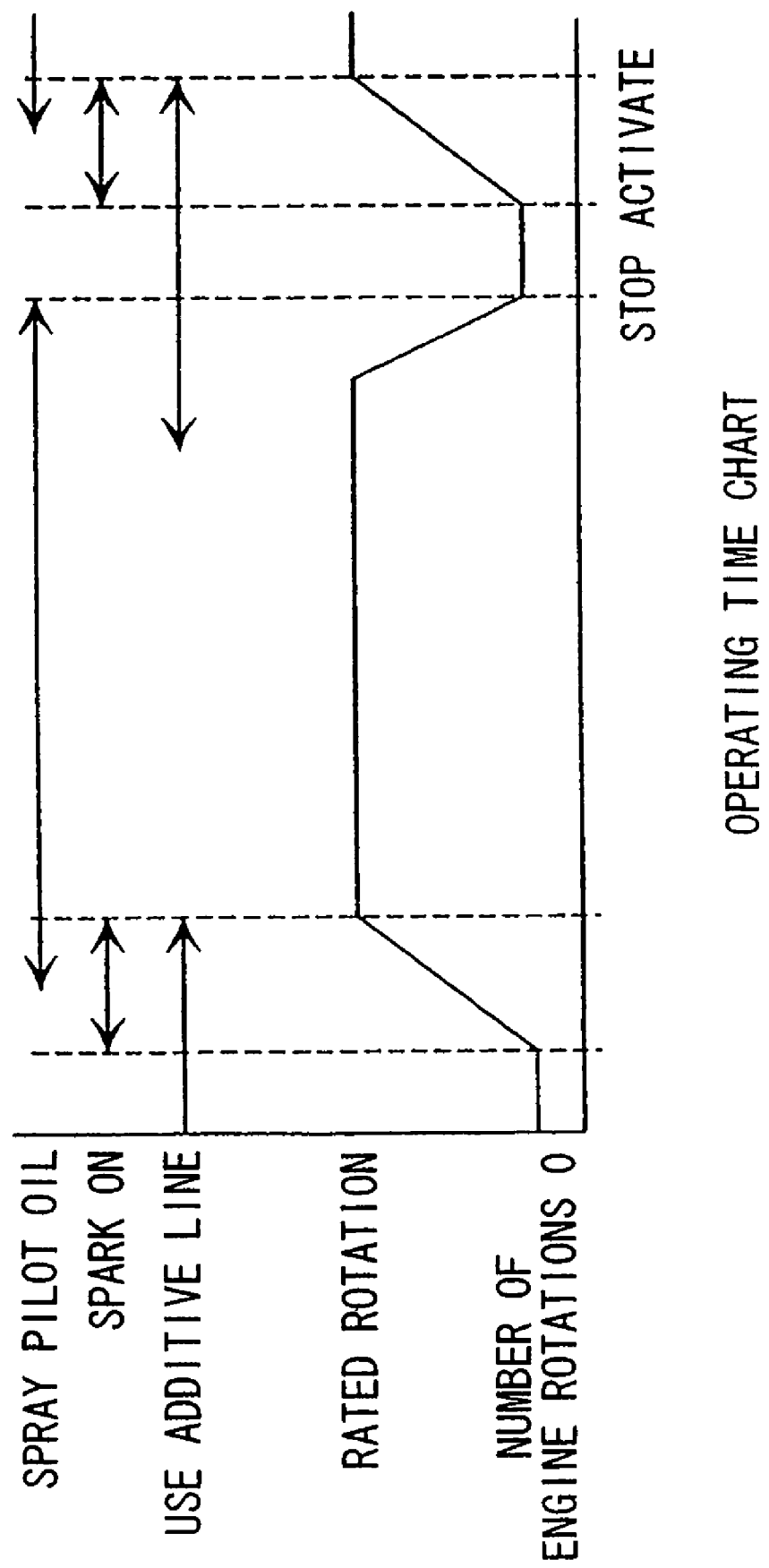
FIG. 3 is a time chart showing an operating method of a first example of a gas engine of the present invention.

A method for operating the gas engine having the constitution described above will explained based on the time chart shown in FIG. 3.

During rated operation of the gas engine, the pilot oil tank 12 is joined to the third pipe 11, and the ignition stimulant-added pilot oil tank 14 is cut off from the third pipe 11. Therefore, only regular pilot oil is supplied through the pipe and sprayed from the pilot oil fuel valve 6 during the pilot oil ignition operation.

The following control is carried out to stop the gas engine while it is operating. Firstly, before stopping the gas engine, as shown in FIG. 3 by "use additive line" before "stop" in the "number of engine rotations", the pilot oil switching valve 13 is switched so that the ignition stimulant-added pilot oil tank 14 becomes connected to the third pipe 11, cutting off the pilot oil tank 12 from the third pipe 11. Then, the pilot oil exhaust valve 15 of the pilot oil main valve 10 is opened, and more pilot oil than the amount as far as the other end of the pilot oil main valve 10 is discharged from the pilot oil switching valve 13.

In this case, the amount of pilot oil to be discharged is expressed by the following equation (1).

$$\text{Amount contained in third pipe 11 [L]} + \text{Amount contained in pilot oil main valve 10 [L]} < \text{Amount of discharged pilot oil [L]} \quad (1)$$

As a result, the pilot oil from the pilot oil switching valve 13 to the other end of the pilot oil main valve 10 is replaced by the ignition stimulant-added pilot oil. Then, by continuing to operate the gas engine by a fixed period of time, the pilot oil in the second pipe 9, the pilot oil pump 7, the pipe 8, and the pilot oil fuel valve 6, which are downstream from the pilot oil main valve 10, is replaced by the ignition stimulant-added pilot oil. Thereafter, the engine is stopped.

In this case, the time taken to operate the gas engine in order to replace the oil downstream from the pilot oil main valve 10 with the ignition stimulant-added pilot oil is expressed by the following equation (2).

$$\{(\text{Amount contained in second pipe 9} + \text{Amount contained in pilot oil pump 7} + \text{Amount contained in pipe 8} + \text{Amount contained in pilot oil fuel valve 6})[L] \times \text{Number of cylinders}\} \div \text{Amount of pilot oil consumed [L/min]} < \text{Operating time [min]} \quad (2)$$

Furthermore, the amount contained in the ignition stimulant-added pilot oil tank 14 is expressed by the following equation (3).

$$\text{Amount contained in third pipe 11} + \text{Amount contained in pilot oil main valve 10} + (\text{Amount contained in second pipe 9} + \text{Amount contained in pilot oil pump 7} + \text{Amount contained in pipe 8} + \text{Amount contained in pilot oil fuel valve 6})[L] \times \text{Number of cylinders} + \text{Amount of pilot oil needed at the time of activation [L]} < \text{Amount contained in ignition stimulant-added pilot oil tank 14 [L]} \quad (3)$$

As a result of the above control, the sections of the stopped gas engine from the pilot oil switching valve 13 as far as the pilot oil fuel valve 6 become filled with the ignition stimulant-added pilot oil, and the ignition stimulant-added pilot oil tank 14 is connected to the third pipe 11. At the time of activating the gas engine, as shown in FIG. 3 by "use additive line" from a zero "number of engine rotations" to "activate" and "rated operation", the ignition stimulant-added pilot oil tank 14 remains connected to the third pipe 11 until the gas engine reaches rated operation; when the gas engine enters rated operation, the pilot oil switching valve 13 is switched, and the third pipe 11 is connected to the pilot oil tank 12.

The gas engine is activated by sparking the spark plug 4. As shown by "spark ON" in FIG. 3, from "activate" in "number of engine rotations" to "rated operation", the spark of the spark plug 4 continues until the gas engine reaches rated operation.

As the number of engine rotations increases, so does the pressure applied to the ignition stimulant-added pilot oil by the pilot oil pump 7. Then, as the number of engine rotations further increases, when the pressure applied to the ignition stimulant-added pilot oil has exceeded the valve-open pressure of the pilot oil fuel valve 6, the ignition stimulant-added pilot oil starts to spray. As shown in FIG. 3 by the timing of "pilot oil spray", the ignition stimulant-added pilot oil starts to spray before the gas engine reaches rated operation. Then, at the point where the compression temperature in the preparatory combustion chamber 5 at the time of spraying the pilot oil exceeds the self-ignition temperature of the pilot oil, the pilot oil ignition operation starts, and the spark of the spark plug 4 stops. For example, when the number of rotations of the gas engine has reached the rated number of rotations, the pilot oil ignition operation starts, and the spark of the spark plug 4 stops. Since the ignition stimulant has been added to the pilot oil used in the pilot oil ignition operation, misfire is unlikely to occur.

As shown in FIG. 3 by "use additive line" after the "rated operation" of "number of engine rotations", when the gas engine reaches rated operation, the pilot oil switching valve 13 is switched, cutting off the ignition stimulant-added pilot oil tank 14 from the third pipe 11, so that the third pipe 11 is connected to the pilot oil tank 12. Therefore, during rated operation, the gas engine is ignited by regular pilot oil supplied from the pilot oil tank 12.

As described above, at the time of activating the gas engine, regular pilot oil is replaced by ignition stimulant-added pilot oil, and consequently, the shift to pilot oil ignition from activation by the spark plug 4 is performed smoothly without generating misfire. Moreover, since the number of engine rotations which is unlikely to generate misfire at the time of activation can be reduced to less than in a conventional gas engine, activation is more dependable and smoother, increasing the reliability of the gas engine. Further, in a constitution where the exit of the pilot oil exhaust valve 15 is connected by a fourth pipe to the pilot oil tank 12, the pilot oil which is discharged from the pilot oil main valve 10 can be returned to the pilot oil tank 12, thereby avoiding wasteful energy consumption. In this case, even when a small amount of mixed oil returns to the tank, no problems arise in the operation of the engine.

A specific example of effects of the gas engine having the constitution described above, and an operating method thereof, will be explained with reference to FIG. 4.

Figure 4:
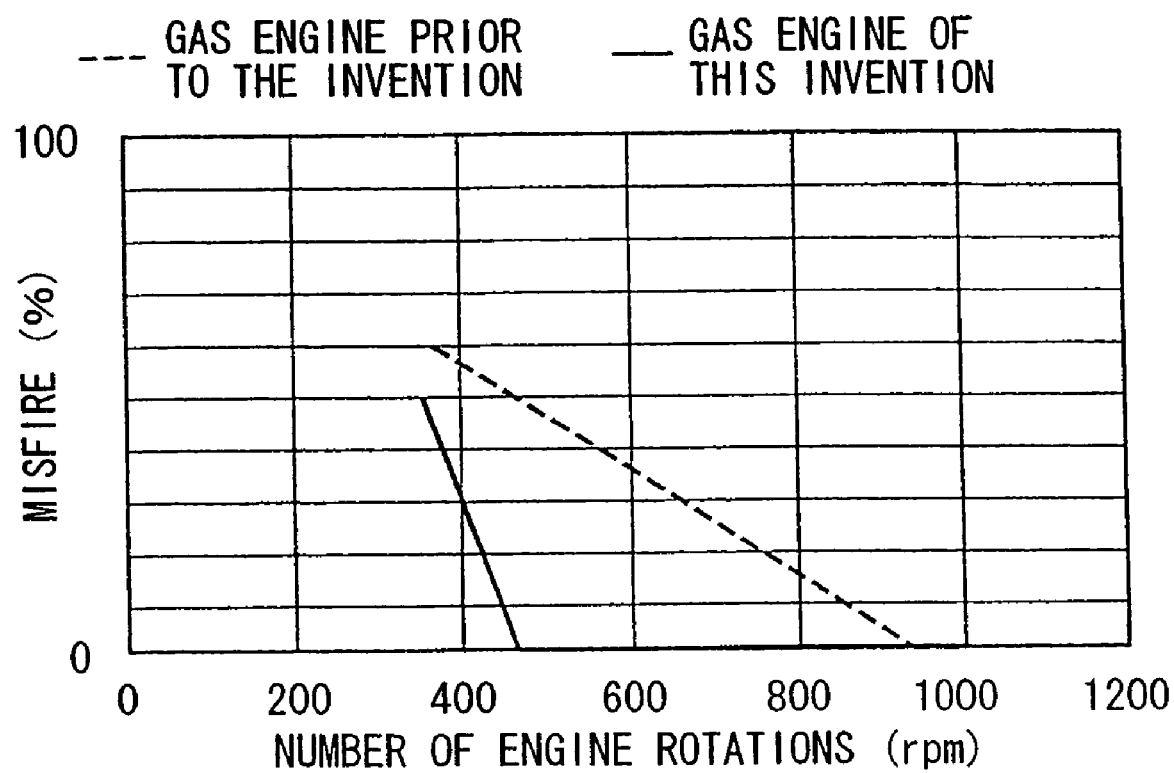
FIG. 4 is a diagram showing the relationship between the rate of misfire and the number of engine rotations, in order to compare the effects of the first example of the gas engine of the present invention (solid line) with the gas engine proposed by the present inventors prior to the present application.

FIG. 4 shows the misfire rates at the time of activation of a six-cylinder gas engine having a bore of 220 mm and a stroke of 300 mm (shown by the broken line in FIG. 4), which was proposed by the present inventors prior to the present invention, and the gas engine of the present invention having a bore of 220 mm and a stroke of 300 mm (shown by the solid line in FIG. 4). The misfire rate represents the percentage of cycles in which the P mi (indicated mean effective pressure shown in FIG. 4) was below zero, out of eighteen continuous cycles.

In the gas engine prior to the present invention (shown by the broken line in FIG. 4), the misfire rate at the time of activation decreases as the number of rotations of the engine increases, and becomes zero (no misfire) at 950 rpm.

In contrast, in the gas engine of the present invention (shown by the solid line in FIG. 4), which uses LZ8090 manufactured by the Lubrizol Performance Products Company as the ignition stimulant, mixed in fuel oil A to a percentage of 1%, although the misfire immediately after activation is the same as that in the gas engine prior to the present invention, the misfire rapidly decreases as the number of rotations of the engine increases, and becomes zero when the number of engine rotations is 450 rpm; this is lower than in the gas engine prior to the present invention.

By applying the constitution and method which enable the pilot oil to be replaced with ignition stimulant-added pilot oil at the time of activating the pilot oil ignition gas engine, the misfire rate and number of rotations which misfire ceases to be generated at the time of activating the pilot oil ignition gas engine become less than in conventional engines. Therefore, the engine can be activated reliably and smoothly.

Incidentally, the abovementioned effects of the gas engine according to the present invention are obtained in the case of a six-cylinder gas engine having a cylinder diameter of 220 mm, but the present invention can be applied in pilot oil ignition type gas engines having other cylinder diameters and numbers of cylinders, and can obtain corresponding effects.

A second example of an embodiment of the present invention will be explained with reference to FIG. 5.

Figure 5:
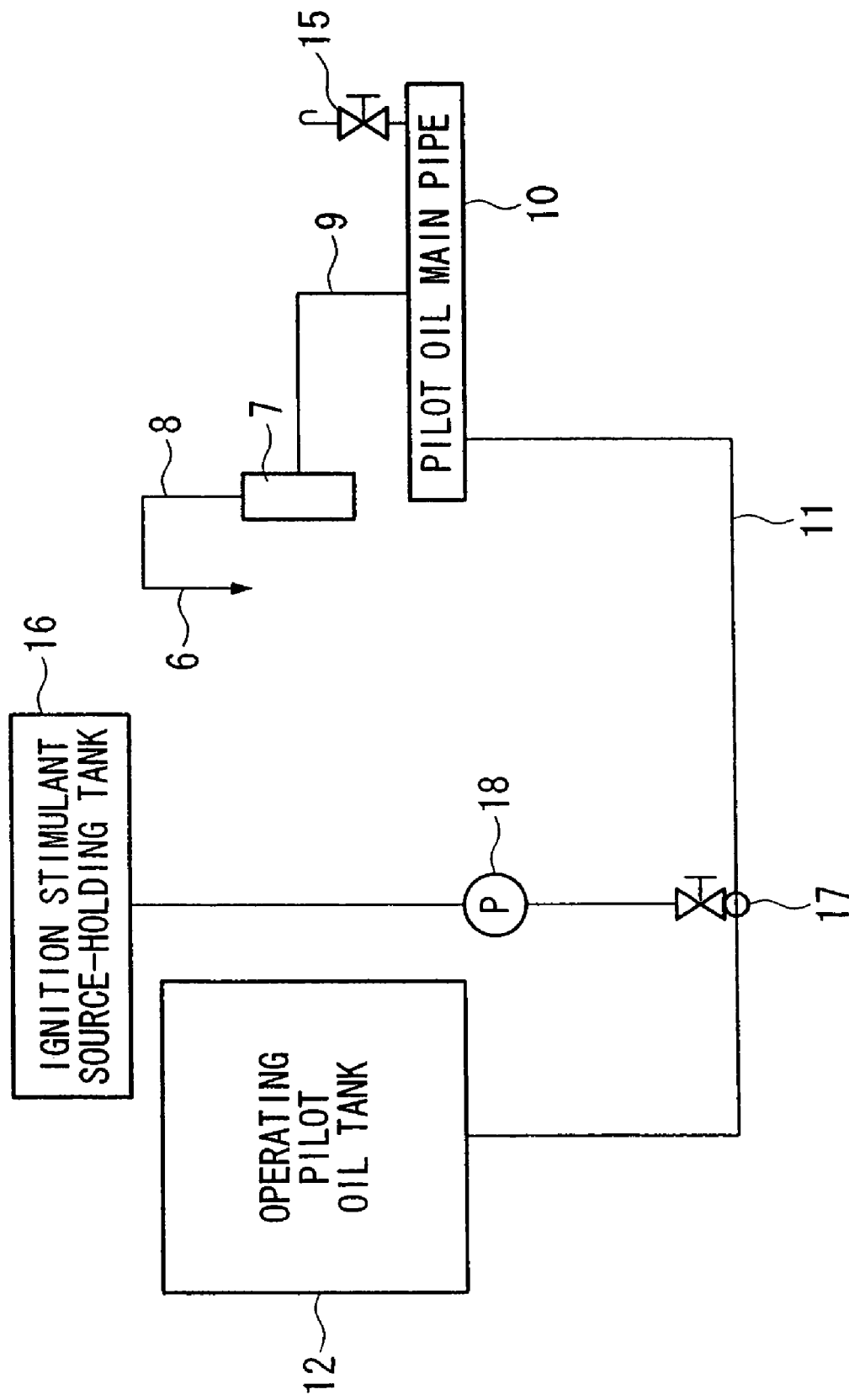
FIG. 5 is a schematic view illustrating the constitution of a second example of the present invention.

As shown in FIG. 5, the gas engine of this example is characterized in that, instead of connecting the ignition stimulant-added pilot oil tank 14 via the pilot oil switching oil valve 13 to the pipe as in the first example, an ignition stimulant tank (ignition stimulant source-holding tank) 16 is connected to the third pipe 11 via a flow adjusting valve 17.

The amount contained in the ignition stimulant tank 16 is expressed by the following equation (4).

{Amount contained in third pipe 11 [L]+Amount
contained in pilot oil main valve 10 [L]+
(Amount contained in second pipe 9+Amount
contained in pilot oil pump 7+Amount contained in pipe 8+Amount contained in pilot oil
fuel valve 6) [L]×Number of cylinders+Amount
of pilot oil needed at the time of activation
[L]×Mixing rate [%]/100<Amount contained in
ignition stimulant tank 16 [L]    (4)

Furthermore, to mix the ignition stimulant from the ignition stimulant tank 16 into the pilot oil in the third pipe 11, a pressure pump 18 is provided on the pipe which connects the ignition stimulant tank 16 to the j17. For the same purpose, instead of, or in addition to, providing the pressure pump 18, the head height to the ignition stimulant tank 16 may acceptably be made higher than the head height to the pilot oil tank 12.

The constitution is otherwise identical to that of the first example, and so is its operating method. Furthermore, this example obtains practically the same effects as the first example.

The invention claimed is:

1. A pilot oil ignition type gas engine having a pilot oil fuel valve provided in a combustion chamber, an operating pilot oil tank, and a pipe section which connects the pilot oil fuel valve to the operating pilot oil tank, the pilot oil ignition type gas engine being compression-ignited by pilot oil sprayed from the pilot oil fuel valve into the combustion chamber; wherein an ignition stimulant-added pilot oil tank being connected to the pipe section via a pilot oil switching valve.

2. A pilot oil ignition type gas engine having a plurality of pilot oil combustion valves provided in a plurality of combustion chambers, a plurality of pilot oil pumps provided to each of the pilot oil combustion valves, a plurality of first pipes which connect the pilot oil combustion valves with the corresponding pilot oil pumps, a pilot oil main pipe, a plurality of second pipes which connect the pilot oil pumps to the pilot oil main pipe, an operating pilot oil tank, and a pipe which connects an end of the pilot oil main pipe to the operating pilot oil tank; wherein a pilot oil exhaust valve being provided at another end of the pilot oil main pipe, and an ignition stimulant-added pilot oil tank being connected to the third pipe via a pilot oil switching valve.

3. The pilot oil ignition type gas engine as described in claim 2, wherein the pilot oil exhaust valve and the operating pilot oil tank are connected by a fourth pipe, and pilot oil discharged from the pilot oil exhaust valve is returned to the operating pilot oil tank.

4. A pilot oil ignition type gas engine, comprising:

a combustion chamber; a pilot oil fuel valve in the combustion chamber; an oil pump coupled to the pilot oil fuel valve; a main pilot oil pipe coupled to the oil pump; a pipe section coupled to the main pilot oil pipe; an operating pilot oil tank; an ignition stimulant-added pilot oil tank; and a pilot oil switching valve coupled to the pipe section, the operating pilot oil tank, and the ignition stimulant-added pilot oil tank, wherein the pilot oil switching valve is operable to selectively couple at least one of the operating pilot oil tank and the ignition stimulant-added pilot oil tank to the pipe section.

5. The pilot oil ignition type gas engine of claim 4, further comprising a pilot oil exhaust valve coupled to the main pilot oil pipe.

6. The pilot oil ignition type gas engine of claim 4, further comprising a first pilot oil arranged in the operating pilot oil tank and a second stimulant-pilot oil mixture arranged in the stimulant-added pilot oil tank.

7. The pilot oil ignition type gas engine of claim 1, wherein an ignition stimulant-added pilot oil tank being connected to the pipe section via a pilot oil switching valve comprises:

a pilot oil ignition type gas engine comprising a member for replacing a pilot oil with an ignition stimulant-added pilot oil when the engine is started.

8. The pilot oil ignition type gas engine of claim 2, an ignition stimulant-added pilot oil tank being connected to the third pipe via a pilot oil switching valve comprises:

a pilot oil ignition type gas engine comprising a member for replacing a pilot oil with an ignition stimulant-added pilot oil when the engine is started.

* * * * *